(12) United States Patent
Tian et al.

(10) Patent No.: US 7,725,411 B2
(45) Date of Patent: May 25, 2010

(54) METHOD, APPARATUS, MOBILE TERMINAL AND COMPUTER PROGRAM PRODUCT FOR PROVIDING DATA CLUSTERING AND MODE SELECTION

(75) Inventors: Jilei Tian, Tamere (FI); Jani K. Nurminen, Lempäälä (FI); Victor Popa, Tampere (FI)

(73) Assignee: Nokia Corporation, Espoo (FI)

( * ) Notice: Subject to any disclaimer, the term of this patent is extended or adjusted under 35 U.S.C. 154(b) by 815 days.

(21) Appl. No.: 11/396,831

(22) Filed: Apr. 3, 2006

(65) Prior Publication Data
US 2007/0233625 A1 Oct. 4, 2007

(51) Int. Cl.
G06E 1/00 (2006.01)
G06E 3/00 (2006.01)
G06G 7/00 (2006.01)

(52) U.S. Cl. .......................... 706/20; 702/13; 382/103
(58) Field of Classification Search ....................... None
See application file for complete search history.

(56) References Cited

U.S. PATENT DOCUMENTS

2004/0133531 A1* 7/2004 Chen et al. ..................... 706/8
2006/0093188 A1* 5/2006 Blake et al. ................. 382/103

* cited by examiner

Primary Examiner—David R Vincent
Assistant Examiner—Kalpana Bharadwaj
(74) Attorney, Agent, or Firm—Alston & Bird LLP (57) ABSTRACT

An apparatus for providing data clustering and mode selection includes a training element and a transformation element. The training element is configured to receive a first training data set, a second training data set and auxiliary data extracted from the same material as the first training data set. The training element is also configured to train a classifier to group the first training data set into M clusters based on the auxiliary data and the first training data set and train M processing schemes corresponding to the M clusters for transforming the first training data set into the second training data set. The transformation element is in communication with the training element and is configured to cluster the second training data set into M clusters based on features associated with the second training data set.

28 Claims, 5 Drawing Sheets

METHOD, APPARATUS, MOBILE TERMINAL AND COMPUTER PROGRAM PRODUCT FOR PROVIDING DATA CLUSTERING AND MODE SELECTION

TECHNOLOGICAL FIELD

Embodiments of the present invention relate generally to data processing and, more particularly, relate to a method, apparatus, and computer program product for providing data clustering and mode selection in a multi-mode data processing environment.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In many applications, it is necessary for the user to receive audio information such as oral feedback or instructions from the network. An example of such an application may be paying a bill, ordering a program, receiving driving instructions, etc. Furthermore, in some services, such as audio books, for example, the application is based almost entirely on receiving audio information. It is becoming more common for such audio information to be provided by computer generated voices. Accordingly, the user's experience in using such applications will largely depend on the quality and naturalness of the computer generated voice. As a result, much research and development has gone into speech processing techniques in an effort to improve the quality and naturalness of computer generated voices.

Examples of speech processing include speech coding and voice conversion related applications. In order to improve the accuracy of speech processing, or indeed many other types of data processing, a process called clustering may be employed. For example, a conventional approach to clustering in the context of speech processing has been to create clusters based on voicing, thereby creating two clusters or modes: voiced and unvoiced. However, this classification is heuristic, and it does not provide an optimal solution from the viewpoint of accuracy. In fact, the performance can be far from optimal. In addition, such prior art methods typically require storage or transmission of additional information regarding mode selection. Accordingly, an increased bit rate or bit usage results, which can be undesirable since it may lead to increases in memory requirements.

Particularly in mobile environments, increases in memory consumption directly affect the cost of devices employing such methods. However, even in non-mobile environments, the possible increase in bit rate and especially the non-optimal performance are not desirable. Thus, a need exists for providing a mechanism for increasing the accuracy of data processing which can be efficiently employed.

BRIEF SUMMARY

A method, apparatus and computer program product are therefore provided to improve data processing by providing a novel scheme for data clustering and mode selection. In particular, a method, apparatus and computer program product are provided that initially cluster data based on features associated with training output data and then trains a classifier or mode selector to group training input data based on features associated with auxiliary data. A model is then trained for each group so that when input data is received, for example, a conversion or compression of the input data can be made using an appropriate model or codebook based on the auxiliary data associated with corresponding input data. Accordingly, inaccuracies in data processing may be reduced and corresponding resource consumption needed to achieve such improvement may also be reduced.

In one exemplary embodiment, a method of providing data clustering and mode selection is provided. The method includes obtaining a first training data set, a second training data set and auxiliary data extracted from the same material as the first training data set. For example, the first training data set may include training source data and the second training data set may include training target data. clustering the second training data set into M clusters based on features associated with the second training data set, training a classifier to group the first training data set into the same M clusters based on the auxiliary data and the first training data set, and training M processing schemes corresponding to the M clusters for transforming the first training data set into the second training data set. The method may further include extracting an auxiliary feature from input data and using the auxiliary feature to process the input data using one of the M processing schemes that corresponds to a respective one of the M clusters selected by the classifier based on the auxiliary feature.

In another exemplary embodiment, a computer program product for providing data clustering and mode selection is provided. The computer program product includes at least one computer-readable storage medium having computer-readable program code portions stored therein. The computer-readable program code portions include first, second, third and fourth executable portions. The first executable portion is for obtaining a first training data set, a second training data set and auxiliary data extracted from same material as the first training data set. The second executable portion is for clustering the second training data set into M clusters based on features associated with the second training data set. The third executable portion is for training a classifier to group the first training data set into M clusters based on the auxiliary data and the first training data set. The fourth executable portion is for training M processing schemes corresponding to the M clusters for transforming the first training data set into the second training data set.

In another exemplary embodiment, an apparatus for providing data clustering and mode selection is provided. The apparatus includes a training element and a transformation element. The training element is configured to receive a first training data set, a second training data set and auxiliary data extracted from the same material as the first training data set.

The training element is also configured to train a classifier to group the first training data set into M clusters based on the auxiliary data and train M processing schemes corresponding to the M clusters for transforming the first training data set into the second training data set. The transformation element is in communication with the training element and is configured to cluster the second training data set into M clusters based on features associated with the second training data set.

In another exemplary embodiment, an apparatus for providing data clustering and mode selection is provided. The apparatus includes a training element and a compression element. The training element is configured to receive a training data set and auxiliary data extracted from the same material as the first training data set. The training element is also configured to train a classifier to group the training data set into M clusters based on the auxiliary data and train M processing schemes corresponding to the M clusters. The compression element is in communication with the training element and is configured to cluster the training data set into M clusters based on features associated with the training data set. The compression element is configured to use an auxiliary feature extracted from input data to process the input data using one of the M compression schemes that corresponds to a respective one of the M clusters selected by the classifier based on the auxiliary feature.

In another exemplary embodiment, an apparatus for providing data clustering and mode selection is provided. The apparatus includes means for obtaining a first training data set, a second training data set and auxiliary data extracted from the first training data set, means for clustering the second training data set into M clusters based on features associated with the second training data set, means for training a classifier to group the first training data set into M clusters based on the auxiliary data, and means for training M processing schemes corresponding to the M clusters for transforming the first training data set into the second training data set.

In one exemplary embodiment, a method of providing data clustering and mode selection is provided. The method includes obtaining a training data set and auxiliary training data, clustering the training data set into M clusters based on features associated with the training data set, training a classifier to group the data into the same M clusters based on the auxiliary data, and training M data compression schemes corresponding to the M clusters.

Embodiments of the invention may provide a method, apparatus and computer program product for advantageous employment in speech processing or any data processing environment. As a result, for example, mobile terminal users may enjoy improved data processing capabilities without appreciably increasing memory and power consumption of the mobile terminal.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
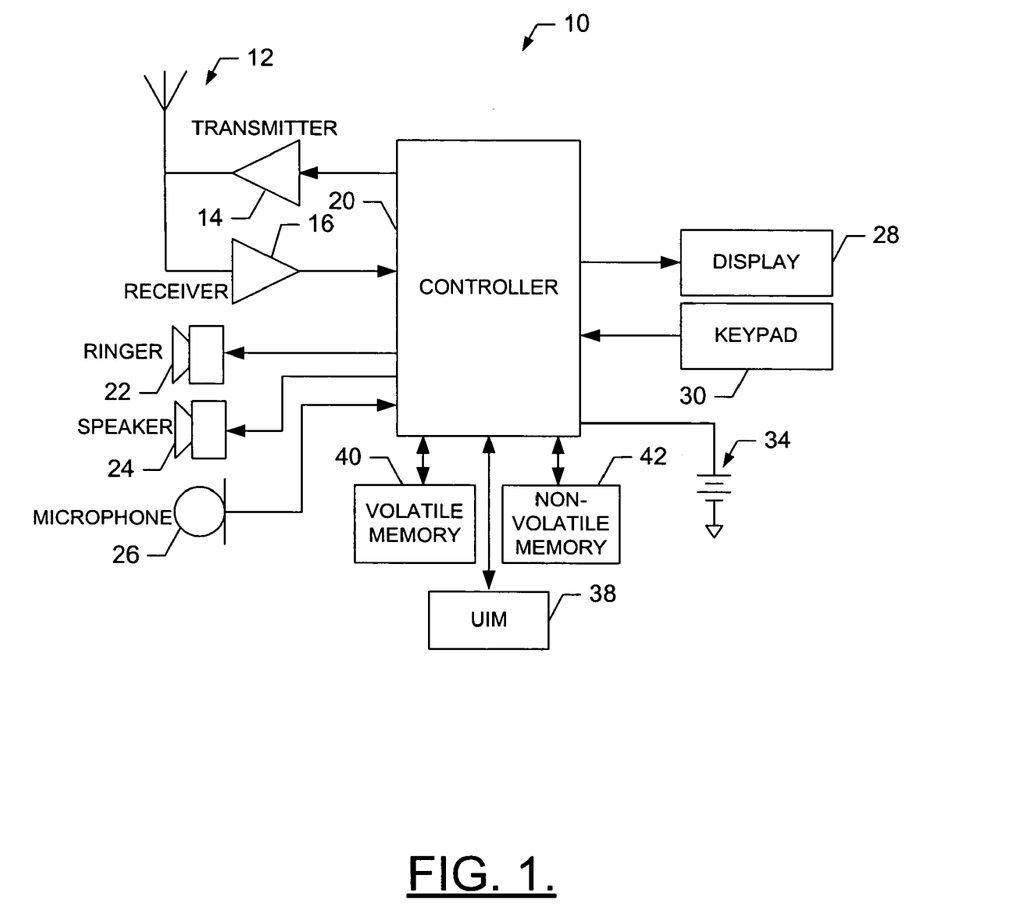
FIG. 1 is a schematic block diagram of a mobile terminal according to an exemplary embodiment of the present invention.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers and other types of voice and text communications systems, can readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, and TD-SCDMA.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example. Also, for example, the controller 20 may be capable of operating a software application capable of analyzing text and selecting music appropriate to the text. The music may be stored on the mobile terminal 10 or accessed as Web content.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a universal identity element (UIM) 38. The UIM 38 is typically a memory device having a processor built in. The UIM 38 may include, for example, a subscriber identity element (SIM), a universal integrated circuit card (UICC), a universal subscriber identity element (USIM), a removable user identity element (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
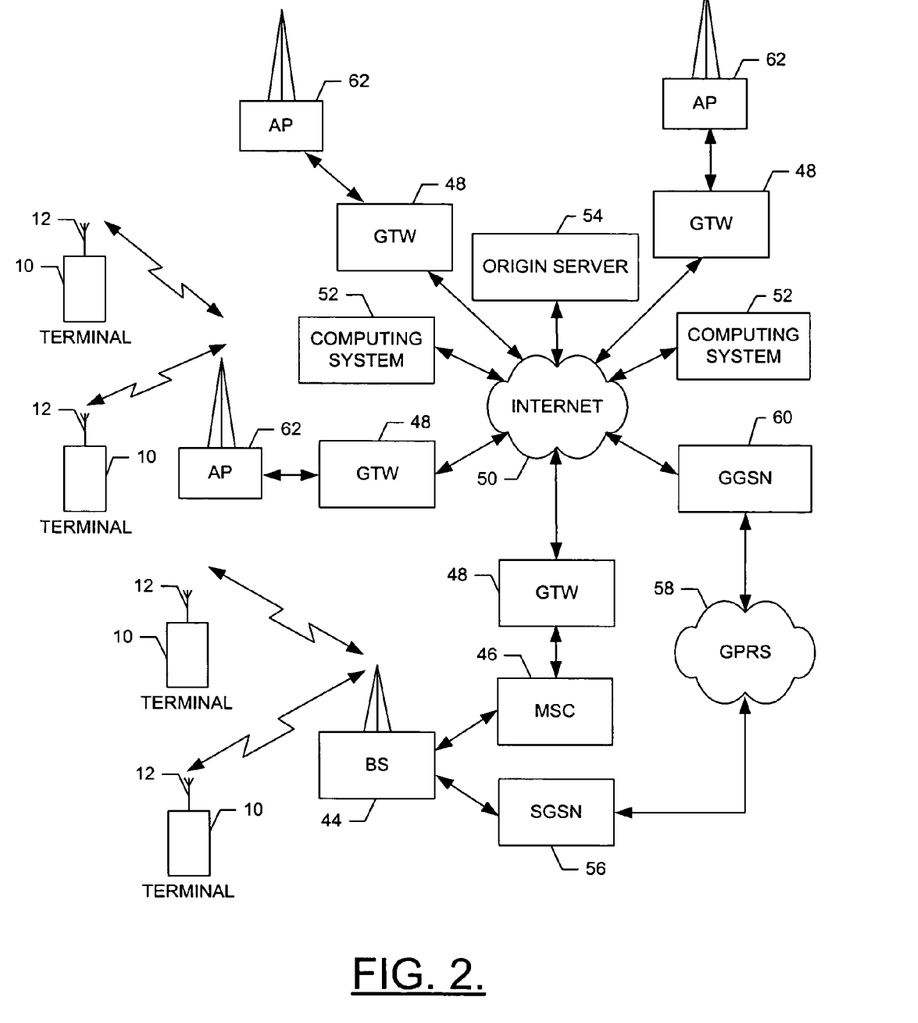
FIG. 2 is a schematic block diagram of a wireless communications system according to an exemplary embodiment of the present invention.

Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Figure 3:
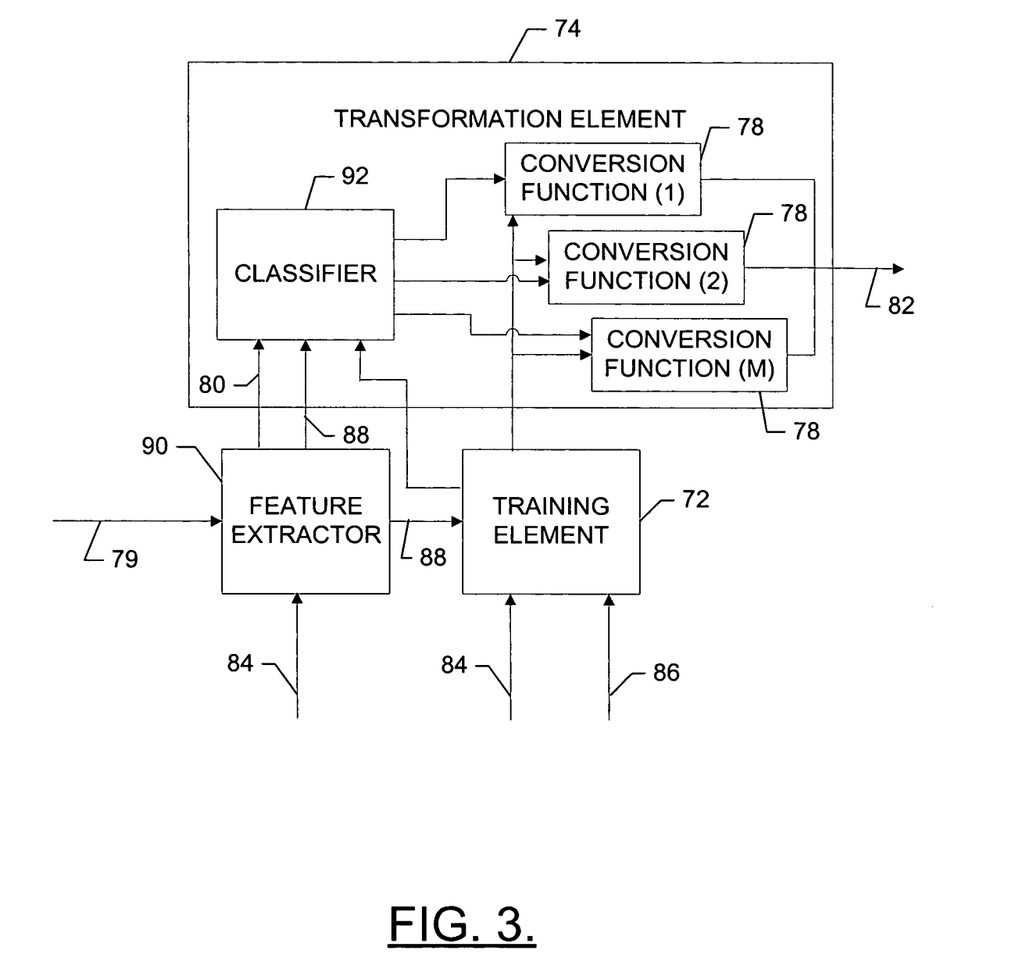
FIG. 3 illustrates a block diagram of portions of an apparatus for providing data clustering and mode selection according to an exemplary embodiment of the present invention.

An exemplary embodiment of the invention will now be described with reference to FIG. 3, in which certain elements of a system for providing data clustering and mode selection in a data processing environment are displayed. The system of FIG. 3 may be employed, for example, on the mobile terminal 10 of FIG. 1. However, it should be noted that the system of FIG. 3, may also be employed on a variety of other devices, both mobile and fixed, and therefore, embodiments of the present invention should not be limited to application on devices such as the mobile terminal 10 of FIG. 1. It should also be noted, however, that while FIG. 3 illustrates one example of a configuration of a system for providing data clustering and mode selection, numerous other configurations may also be used to implement embodiments of the present invention. Furthermore, although FIG. 3 will be described in the context of a text-to-speech (TTS) conversion to illustrate an exemplary embodiment in which speech conversion using Gaussian Mixture Models (GMMs) is practiced, embodiments of the present invention need not necessarily be practiced in the context of TTS, but instead applies any speech processing and, more generally, to data processing. Thus, embodiments of the present invention may also be practiced in other exemplary applications such as, for example, in the context of voice or sound generation in gaming devices, voice conversion in chatting or other applications in which it is desirable to hide the identity of the speaker, translation applications, speech coding, etc. Additionally, speech conversion may be performed using modeling techniques other than GMMs.

Referring now to FIG. 3, a system for providing data clustering and mode selection is provided. The system includes a training element 72 and a transformation element 74. Each of the training element 72 and the transformation element 74 may be any device or means embodied in either hardware, software, or a combination of hardware and software capable of performing the respective functions associated with each of the corresponding elements as described below. In an exemplary embodiment, the training element 72 and the transformation element 74 are embodied in software as instructions that are stored on a memory of the mobile terminal 10 and executed by the controller 20. However, each of the elements above may alternatively operate under the control of a corresponding local processing element or a processing element of another device not shown in FIG. 3. A processing element such as those described above may be embodied in many ways. For example, the processing element may be embodied as a processor, a coprocessor, a controller or various other processing means or devices including integrated circuits such as, for example, an ASIC (application specific integrated circuit).

It should be noted that although FIG. 3 illustrates the training element 72 as being a separate element from the transformation element 74, the training element 72 and the transformation element 74 may also be collocated or embodied in a single element or device capable of performing the functions of both the training element 72 and the transformation element 74. Additionally, as stated above, embodiments of the present invention are not limited to TTS applications. Accordingly, any device or means capable of producing a data input for transformation, conversion, compression, etc., including, but not limited to, data inputs associated with the exemplary applications listed above are envisioned as providing a data source such as source speech 79 for the system of FIG. 3. According to the present exemplary embodiment, a TTS element capable of producing synthesized speech from computer text may provide the source speech 79. The source speech 79 may then be communicated to a feature extractor 90 capable of extracting data corresponding to a particular feature or property from a data set. In an exemplary embodiment, the feature extractor extracts a source speech feature 80 which is desired for conversion into a target speech feature 82 and also extracts auxiliary features which may be communicated as auxiliary data 88 to either the training module 72 or a classifier 92.

The transformation element 74 is capable of transforming the source speech feature 80 into the target speech feature 82. In this regard, the transformation element 74 may be employed to include a transformation model which is essentially a trained GMM for transforming a source speech feature 80 into a target speech feature 82. In order to produce the transformation model, a GMM is trained using training source speech feature data 84 and training target speech feature data 86 to determine a conversion function 78, which may then be used to transform the source speech feature 80 into the target speech feature 82. In an exemplary embodiment, multiple trained GMMs which each correspond to a particular cluster may be employed for conversion. Accordingly, data input into the system may be processed by a mode selector or classifier which routes the data to an appropriate cluster for conversion via the corresponding trained GMM as described in greater detail below. The number of the clusters may, for example, be selected manually, be a predetermined or preprogrammed value, or be selected automatically based on a given criteria. For example, the number of the clusters may be determined based on criteria such as a size of a target training data set, the average distance within each cluster, improvement gain or any other suitable criteria.

In order to understand the conversion function 78, some background information is provided. A probability density function (PDF) of a GMM distributed random variable z can be estimated from a sequence samples of $z[z_1 \ z_2 \ldots z_t \ldots z_p]$ provided that a dataset is long enough as determined by one of skill in the art, by use of classical algorithms such as, for example, expectation maximization (EM). In a particular case when $z=[x^T y^T]^T$ is a joint variable, the distribution of z can serve for probabilistic mapping between the variables x and y. Thus, in an exemplary voice conversion application, x and y may correspond to similar features from a source and target speaker, respectively. For example, x and y may correspond to a line spectral frequency (LSF) extracted from the given short segment of the aligned speech of the source and target speaker, respectively.

According to an exemplary embodiment of the present invention in which speech conversion from source speech to target speech is desired, multiple conversion functions 78 may be trained to correspond to GMMs associated with distinct groups, modes or clusters. Accordingly, the source speech feature 80 input for conversion may be converted using a corresponding conversion function 78 which is selected at least in part based on the auxiliary data 88 as described below. In this regard, the auxiliary data 88 represents corresponding speech features in data other than the feature which is used for conversion. In other words, the auxiliary data 88 may represent features or information present in input data that is not used in training of the actual conversion functions, but which may be useful in grouping, clustering or otherwise categorizing data. In the conversion/transformation application, the input data can also be part of auxiliary data 88. In other words, in a conversion/transformation application, classification can also utilize the source/input data. For example, if data processing is desired on data related to ages of participants without knowing the actual ages, the auxiliary data may be data other than participant age which may be useful in grouping the participants according to age such as clothing, music preference, food preference, or any other available data on the participants that is not directly (but potentially indirectly) related to their age. In certain situations the auxiliary data 88 may correlate strongly with age, while in others the auxiliary data 88 may not strongly correlate with age. However, as will be shown below, such correlations will not hinder performance of embodiments of the present invention, whether the correlations are strong or weak.

In an exemplary embodiment, the auxiliary data 88 may be automatically extracted from a data set such as the source data (i.e., the training source speech feature data 84) by the feature extractor 90. However, any other suitable means of obtaining the auxiliary data 88 is also envisioned. The feature extractor 90 may be any device or means embodied in either hardware, software, or a combination of hardware and software capable of extracting data corresponding to a particular feature or property from a data set. For example, if the data set includes voice data and a LSF conversion is to be performed on the voice data, the auxiliary data 88 may include source-speech related features such as $dLSF/dt$, $d_2LSF/dt^2$, speech identity (i.e., male or female), voicing, pitch, energy, residual spectrum, etc.

As an overview of an exemplary embodiment of speech conversion, multiple models are used such that for each cluster an associated model is optimized for improved accuracy of the conversion. However, since a most effective clustering is based on target data properties, and during conversion, the target data properties are not known, it is necessary to develop a way to cluster source data based on properties other than the target data properties in a way that approximates the clustering that would occur if the target data properties were known. Accordingly, training data including training source data, training target data and auxiliary data is obtained. Properties of the training target data are used to cluster the training target data. A mode selector is then trained to correlate auxiliary features to corresponding clusters in order to develop a discriminative function for grouping the training source data into clusters corresponding to the clusters developed using the target training data based on the auxiliary features. Thus, during operation, the discriminative function can be used to select an appropriate model for conversion of source data based on the auxiliary data associated with the source data using the discriminative function.

More specifically, an exemplary speech conversion may include an initial operation of collecting a data set including the training source speech feature data 84 and the training target speech feature data 86 and the auxiliary data 88 in order to obtain an extended combined feature vector. The data set may be collected, for example, at the training element 72. The training target speech feature data 86 may then be grouped based on a property or properties associated with the training target speech feature data 86 to form clusters. In an exemplary embodiment, a K-mean algorithm may be employed to form the clusters. A source mode selector or classifier 92 may be trained using the clusters and the auxiliary data 88 in order to optimize the classifier 92 to recognize a cluster or mode based on the auxiliary data 88 by training a discriminative function to group the source speech feature data 84 into the clusters based on the auxiliary data 88 and possibly also on the source data. Then, a processing scheme or conversion function 78 for a particular model associated with each of the clusters is trained to perform a conversion in order to complete a training phase of the speech conversion. During a subsequent conversion phase, auxiliary data 88 associated with the source speech feature 80 may be used to select a respective mode or cluster and then the source speech feature 80 is converted to the target speech feature 82 using a corresponding model for the conversion function 78 associated with the respective cluster.

According to an exemplary embodiment in which conversion of line spectral frequency (LSF) data is performed for a particular source speech, LSF vectors y from a target speaker may be considered as target data (i.e., the training target speech feature data 86). The LSF vectors y from the target speaker may then be complemented with corresponding speech features from source data (i.e., the aligned training source speech feature data 84). The corresponding speech features represent data other than that which is used for conversion (i.e., the auxiliary data 88). The auxiliary data 88, denoted in the equations below as aux, can include any or all features one could extract from the source data. After introducing the additional feature or features associated with the auxiliary data 88, an extended $t^{th}$ data vector may be expressed as an extended combined feature vector: $z_t=[x_t, aux_t, y_t]$.

Clusters may then be formed in target LSF space using, for example, a K-mean based clustering algorithm. Thus, for a given extended training set z, clustering is applied on the LSF vectors y from the target speaker to split combined data into M groups $z^{(1)}, z^{(2)}, \ldots, z^{(M)}$. The distribution of y has no overlapping among the clusters, however, the distributions of x and aux may overlap among the clusters. Accordingly, the classifier 92 must be trained to cluster data correctly in the absence of target data. The classifier 92 is trained to find a target-space class using corresponding source space data. In this regard, given a clustered target training set $y^{(1)}, y_{(2)}, \ldots, y^{(M)}$, a source-related data set is clustered accordingly to form $[x\ aux]^{(1)}, [x\ aux]^{(2)}, \ldots, [x\ aux]^{(M)}$, and a discriminative function $D \cdot [x\ aux]^T$ can be trained on the preceding data to find a correct one of the M groups for any source training set based on the source-related data set. In other words, the discriminative function $D \cdot [x\ aux]^T$ can be trained to place source data in a group corresponding to the clustered target training set $y^{(1)}, y^{(2)}, \ldots, y^{(M)}$ based on the auxiliary data 88 associated with the source data.

It should be noted that although the discriminative function $D \cdot [x\ aux]^T$ above is a linear discriminative function, embodiments of the present invention should not be considered as limited to the linear discriminative function above. Rather any discriminative function, linear or nonlinear, or any method for classification may be employed. As such, the discriminative function $D \cdot [x\ aux]^T$ above is provided for purposes of example and not of limitation. Furthermore, as stated above, any features from the source data can be included in the auxiliary data. As such, during an iterative training process, the training element 72 may be configured such that features from auxiliary data 88 which are shown to correlate strongly to the clusters may automatically receive a high weight, while features that do not have useful information for clustering will receive a low weight, such as 0. Thus, adding additional features to the auxiliary data 88, even if the additional features are not useful in clustering, will not degrade performance of the discriminative function with respect to an ability to group source data.

According to the exemplary embodiment described above, a method of providing data clustering and mode selection may include a training phase and a conversion phase in which a trained model is used for speech conversion. In the training phase, auxiliary features are initially defined and extracted from the source training data set and a set of extended combined feature vectors $z_t=[x_t, aux_t, y_t]$ are obtained (all the components of the combined feature vector are assumed aligned). The target training data set y is then split into M clusters using, for example, a K-mean algorithm. Combined data z is then grouped into M clusters based on the clustering of the target training data set y, and a discriminative function $D \cdot [x\ aux]^T$ is trained on the grouped source-related data (i.e., [x aux]). Separate GMMs are trained using a corresponding conversion function 78 for each of the M clusters of training data ($z_t=[x_t, y_t]$). The training data used for the training of a given conversion function can be either the data clustered into the corresponding cluster based on the target data, or the data grouped to the corresponding function using the discriminative function. The latter choice provides enhanced robustness in cases where the classification accuracy is not high. Then, in the conversion phase, predefined auxiliary features are extracted from source data to provide $[x_t, aux_t]$ which is used with the discriminative function to select a corresponding GMM and conversion function 78. Using the $x_t$ feature vector and the corresponding GMM, the source speech feature 80 may be converted into the target speech feature 82. It should be noted that although the preceding describes training a GMM for conversion, any other suitable model could be used. As such, those skilled in the art will recognize that certain modeling techniques are advantageous for use with certain data processing evolutions. Examples of other modeling techniques include, but are not limited to, neural networks, codebooks, Hidden Markov Models (HMMs), linear transformations or numerous other models.

To highlight a performance advantage achievable using an embodiment of the present invention, a comparison may be made between a conventional approach using voiced/unvoiced clustering and clustering using the classifier 92 described above. In each example below, the same initial training data set z was employed and testing data sets were also identical. Results achieved are summarized in Table 1 which compares conversion mean squared error (MSE) between voiced/unvoiced clustering and data-driven clustering as proposed herein.

TABLE 1

Conversion MSE between voiced/unvoiced clustering and proposed data-driven clustering schemes.

|  | Training Set | Testing Set |
| --- | --- | --- |
| Conventional (voiced/unvoiced clustering) | 23058 | 23559 |
| Embodiment 1 (using classifier described above) | 21015 | 21833 |
| Embodiment 2 (ideal case; perfect classification) | 15295 | 15770 |

For the conventional case, the MSE for LSF conversion was 23058 for the training set and 23559 for the testing set. For Embodiment 1, when implemented as described above, MSE scores of 21015 for the training set and 21833 for the testing set were achieved. Embodiment 2 employs an ideal classifier (hypothetical) with a 100% classification rate. In the ideal case, MSE scores of 15295 and 15770 were achieved for the training and the testing set, respectively.

As is evident from Table 1, embodiments of the invention outperform the conventional approach with a clear margin. This performance advantage was achieved even though the conventional voiced/unvoiced classification offers a natural and efficient clustering scheme. Accordingly, if embodiments of the invention are compared against some arbitrary clustering scheme, an even larger improvement may be expected. In addition to the demonstrated performance advantage, embodiments of the invention may also offer other benefits over the conventional approach. For example, embodiments of the invention can be used with any number of clusters due to the completely data-driven nature of embodiments of the present invention, while the conventional approach only works with two clusters.

It should be noted that although the preceding description has been provided in the context of voice conversion, embodiments of the present invention can also be practiced for other applications, such as speech coding or other data processing. For example, an exemplary embodiment could be used in the quantization of LSF vectors in speech coding. As such, original LSF vectors may be used as the data vectors, and clustering may be performed in this space. A given selection of additional speech parameters (e.g. voicing, pitch and energy) for each frame may be used as auxiliary information, and the mode selector or classifier 92 is trained to find the LSF-space cluster based on the corresponding auxiliary data vector. Finally, a quantizer structure is constructed so that a separate quantizer is trained for each of the clusters. In operation, input data is provided and the auxiliary information is extracted, encoded and used to ensure that the input data is processed by a quantizer corresponding to the cluster with which the input data is associated based on the auxiliary information. The auxiliary data is chosen in such a way that the same information is available also at the decoder side. Moreover, the auxiliary data can be chosen in such a way that it must be transmitted anyway from the encoder to the decoder due to speech coding related reasons, resulting in an implementation where the invention can be used for enhancing the performance without increasing the bit rate at all.

Figure 4:
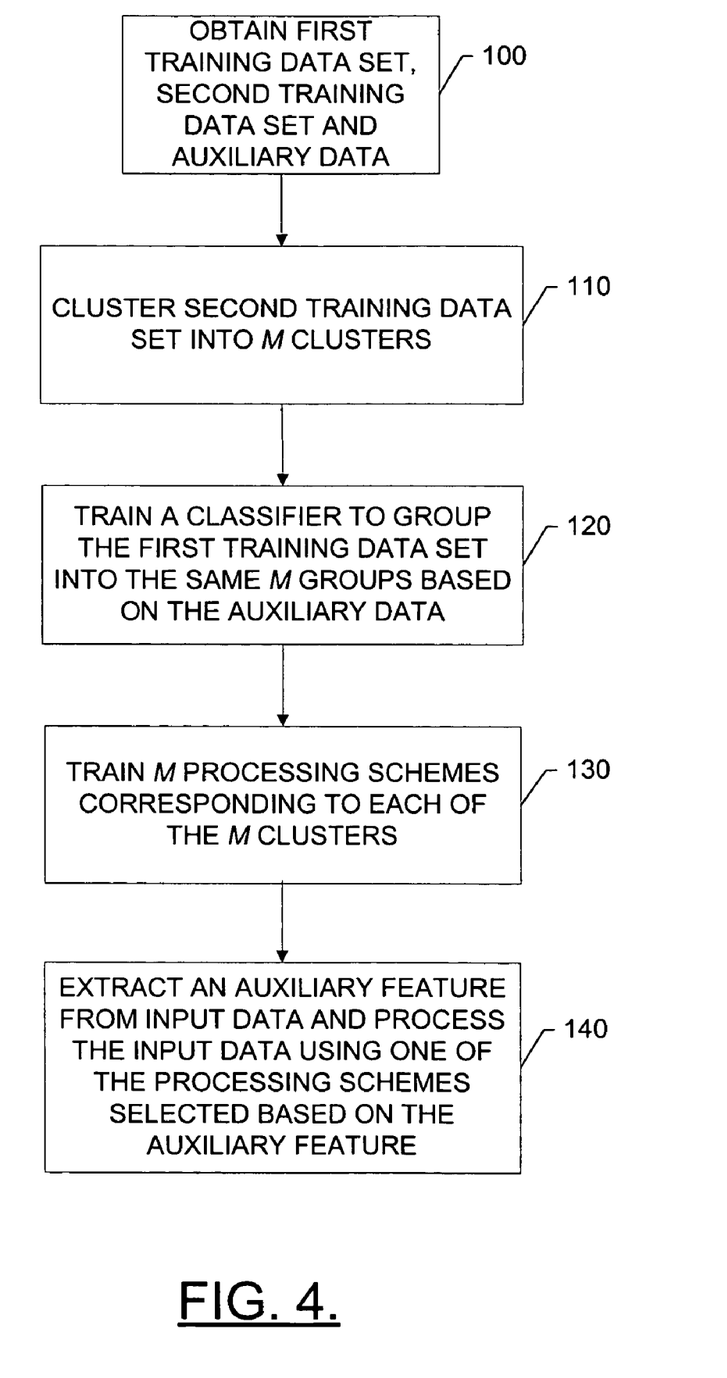
FIG. 4 is a block diagram according to an exemplary method for providing data clustering and mode selection according to an exemplary embodiment of the present invention.
Figure 5:
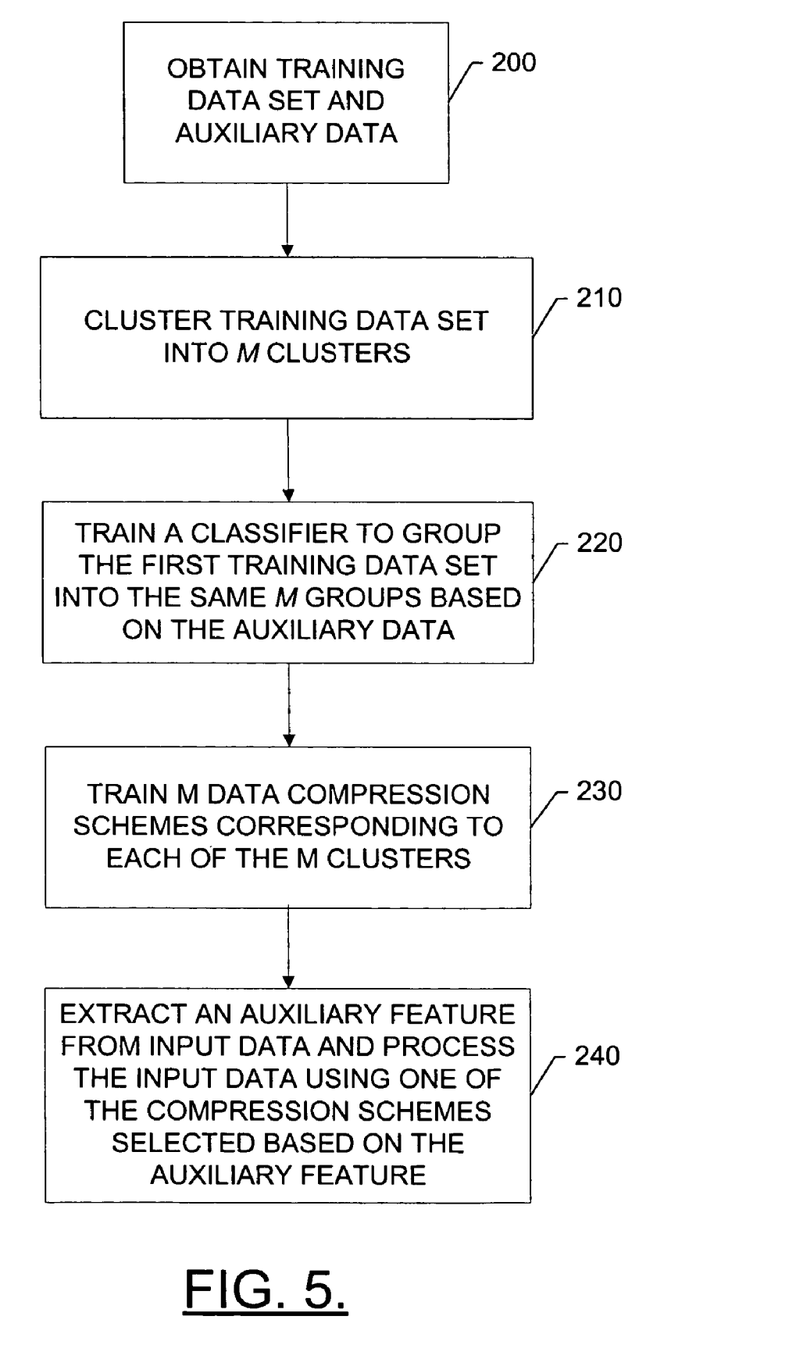
FIG. 5 is a block diagram according to another exemplary method for providing data clustering and mode selection according to an exemplary embodiment of the present invention.

FIGS. 4 and 5 are flowcharts of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method of providing data clustering and mode selection, as shown in FIG. 4, includes obtaining a first training data set, a second training data set and auxiliary data extracted from the same material as the first training data set at operation 100. The auxiliary data used in the training may be defined and extracted as a preliminary operation. At operation 110, the second training data set is clustered into M clusters based on features associated with the second training data set. At operation 120, a classifier is trained to group the first training data set into the same M clusters based on the auxiliary data. M processing schemes are trained corresponding to the M clusters for providing a conversion function between the first training data set and the second training data set at operation 130. During usage of the trained multi-mode system, auxiliary features are extracted from the same input data as the feature to be converted and used to process the feature to be converted using one of the M processing schemes that corresponds to a respective one of the M clusters selected by the classifier based on the auxiliary features and the input data at operation 140. Operation 120 may include obtaining a discriminative function for grouping the first training set data in the M clusters based on the auxiliary data. Meanwhile, according to exemplary embodiments, operation 130 may include training a GMM using a conversion function associated with a particular one of the M clusters for each of the M clusters. Clustering may be initially performed using a K-mean algorithm, or some other clustering method. A number of the clusters may be selected either manually or automatically based on a given criteria.

Another exemplary embodiment of a method of providing data clustering and mode selection in a compression or coding application, is shown in FIG. 5. It should be recognized that FIG. 3 is generally directed to an apparatus for performing the method shown in FIG. 4. FIG. 3 also generally applies to the method shown in FIG. 5, except, for example, that only a single training data set is input into the training element 72 and elements 78 represent compression schemes of compression element 74. As shown in FIG. 5, the method includes obtaining a training data set and auxiliary training data at operation 200. At operation 210, the training data set is clustered into M clusters based on features associated with the training data set. At operation 220, a classifier is trained to group the data into the same M clusters based on the auxiliary data. At operation 230, M data compression schemes are trained corresponding to the M clusters. Operation 230 may include training a quantizer associated with a particular one of the M clusters for each of the M clusters. During usage of the trained multi-mode system, auxiliary features are extracted from the same input data as the feature to be compressed and used to process the feature to be compressed using one of the M data compression schemes that corresponds to a respective one of the M clusters selected by the classifier based on the auxiliary features at operation 240. It should be noted that the compression/coding use case of FIG. 5 is different than the conversion/transformation case of FIG. 4 in that the data set itself cannot be used in the classification since this data is not available at the decoder in the compression/coding use case. Accordingly, in a compression application there is no "first" and "second" data as in the conversion/transformation case. Finally, the auxiliary data should be made available at the decoder.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   obtaining a first training data set corresponding to source data, a second training data set corresponding to target data and auxiliary data including features of the source data and extracted from the same material as the first training data set;
   clustering the second training data set into M clusters based on features associated with the second training data set, M being a positive integer;
   training, via a processor, a classifier to group the first training data set into the same M clusters based on the auxiliary data and the first training data set; and
   training M processing schemes corresponding to the M clusters for transforming data from the first training data set into data from the second training data set,
   wherein training the classifier comprises obtaining a discriminative function for grouping the first training data set in the M clusters based on the auxiliary data and the first training data set.

2. A method according to claim 1, further comprising extracting an auxiliary feature from input data and using the auxiliary feature to process the input data using one of the M processing schemes that corresponds to a respective one of the M clusters selected by the classifier based on the auxiliary feature.

3. A method according to claim 1, wherein training M processing schemes comprises training a model using a conversion function associated with a particular one of the M clusters for each of the M clusters.

4. A method according to claim 3, wherein training the model is performed using one of:
   data grouped into a corresponding cluster based on target data; or
   data grouped to a corresponding cluster using a discriminative function.

5. A method according to claim 1, wherein clustering the second training data set is performed using a K-mean algorithm.

6. A method according to claim 1, further comprising an initial operation of defining and extracting the auxiliary data.

7. A method according to claim 1, wherein clustering the second training data set into M clusters comprises an initial operation of selecting a value of M manually.

8. A method according to claim 1, wherein clustering the second training data set into M clusters comprises an initial operation of selecting a value of M automatically based on a given criteria.

9. A method according to claim 1, wherein the first training data set, the second training data set, and the auxiliary data are aligned data.

10. A computer program product comprising at least one computer-readable storage medium having computer-readable program code portions stored therein, the computer-readable program code portions comprising:
    a first executable portion for obtaining a first training data set corresponding to source data, a second training data set corresponding to target data and auxiliary data including features of the source data and extracted from the same material as the first training data set;
    a second executable portion for clustering the second training data set into M clusters based on features associated with the second training data set, M being a positive integer;
    a third executable portion for training a classifier to group the first training data set into the same M clusters based on the auxiliary data and the first training data set; and
    a fourth executable portion for training M processing schemes corresponding to the M clusters for transforming the first training data set into the second training data set,
    wherein the third executable portion includes instructions for obtaining a discriminative function for grouping the first training data set in the M clusters based on the auxiliary data and the first training data set.

11. A computer program product according to claim 10, further comprising a fifth executable portion for extracting an auxiliary feature from input data and using the auxiliary feature to process the input data using one of the M processing schemes that corresponds to a respective one of the M clusters selected by the classifier based on the auxiliary feature.

12. A computer program product according to claim 8, wherein the second executable portion includes a K-mean algorithm.

13. A computer program product according to claim 8, further comprising a fifth executable portion for an initial operation of defining and extracting the auxiliary data.

14. An apparatus comprising a processor and memory including computer program code, the memory and the computer program code configured to, with the processor, cause the apparatus at least to:
    receive a first training data set corresponding to source data, a second training data set corresponding to target data and auxiliary data including features of the source data and extracted from the same material as the first training data set;
    train a classifier to group the first training data set into M clusters based on the auxiliary data and the first training data set, M being a positive integer;

train M processing schemes corresponding to the M clusters for transforming the first training data set into the second training data set; and cluster the second training data set into the same M clusters based on features associated with the second training data set, wherein the memory and computer program code are further configured to, with the processor, cause the apparatus to obtain a discriminative function for grouping the first training data set in the M clusters based on the auxiliary data and the first training data set.

15. An apparatus according to claim 14, wherein the memory and computer program code are further configured to, with the processor, cause the apparatus to extract an auxiliary feature from input data and the auxiliary data from the first training data set.

16. An apparatus according to claim 15, wherein the memory and computer program code are further configured to, with the processor, cause the apparatus to use the auxiliary feature to process the input data using one of the M processing schemes that corresponds to a respective one of the M clusters selected by the classifier based on the auxiliary feature and the first training data set.

17. An apparatus according to claim 14, wherein the first training data set, the second training data set, and the auxiliary data are aligned data.

18. An apparatus according to claim 14, wherein each of the M processing schemes includes a model trained using a conversion function associated with a particular one of the M clusters for each of the M clusters.

19. An apparatus according to claim 14, wherein the classifier forms a portion of a transformation element and includes a K-mean algorithm.

20. An apparatus according to claim 14, wherein the classifier is configured to select a value of M manually.

21. An apparatus according to claim 14, wherein the classifier is configured to select a value of M automatically based on a given criteria.

22. An apparatus according to claim 14, wherein the apparatus is a mobile terminal.

23. An apparatus comprising:

a processor and memory including computer program code, the memory and the computer program code configured to, with the processor, cause the apparatus at least to:

receive a training data set corresponding to source data and auxiliary data including features of the source data and extracted from the same material as the training data set;

train a classifier to group the training data set into M clusters based on the auxiliary data, M being a positive integer;

train M data compression schemes corresponding to the M clusters; and cluster the training data set into M clusters based on features associated with the training data set, wherein the memory and computer program code are further configured to, with the processor, cause the apparatus to use an auxiliary feature extracted from input data to process the input data using one of the M compression schemes that corresponds to a respective one of the M clusters selected by the classifier based on the auxiliary feature, and wherein the memory and computer program code are further configured to, with the processor, cause the apparatus to obtain a discriminative function for grouping the training data set in the M clusters based on the auxiliary data and the first training data set.

24. An apparatus according to claim 23, wherein the memory and computer program code are further configured to, with the processor, cause the apparatus to extract the auxiliary feature from input data and the auxiliary data from the training data set.

25. An apparatus comprising:

means for obtaining a first training data set corresponding to source data, a second training data set corresponding to target data and auxiliary data including features of the source data and extracted from the same material as the first training data set;

means for clustering the second training data set into M clusters based on features associated with the second training data set, M being a positive integer;

means for training a classifier to group the first training data set into M clusters based on the auxiliary data and the first training data set; and means for training M processing schemes corresponding to the M clusters for transforming the first training data set into the second training data set, wherein means for training the classifier comprises means for obtaining a discriminative function for grouping the first training data set in the M clusters based on the auxiliary data and the first training data set.

26. A method comprising:

obtaining a training data set corresponding to source data and auxiliary data including features of the source data and extracted from the same material as the training data set;

clustering, via a processor, the training data set into M clusters based on features associated with the training data, M being a positive integer;

training a classifier to group the data into the same M clusters based on the auxiliary data;

training M data compression schemes corresponding to the M clusters, and obtaining a discriminative function for grouping the first training set data in the M clusters based on the auxiliary data.

27. A method according to claim 26, further comprising extracting an auxiliary feature from input data and using the auxiliary feature and the input data to process the input data using one of the M data compression schemes that corresponds to a respective one of the M clusters selected by the classifier based on the auxiliary feature.

28. A method according to claim 26, wherein training M data compression schemes comprises training a quantizer associated with a particular one of the M clusters for each of the M clusters.

* * * * *